United States Patent
Kugler et al.

[15] 3,658,673
[45] Apr. 25, 1972

[54] PROCESS FOR CARRYING OUT CHEMICAL REACTIONS

[72] Inventors: Tibor Kugler, Sins; Jakob Silbiger, Basle, both of Switzerland

[73] Assignee: Lonza, Ltd., Gampel/Valais (Direction:Basele), Switzerland

[22] Filed: Dec. 17, 1969

[21] Appl. No.: 885,929

[30] Foreign Application Priority Data

Dec. 24, 1968 Switzerland ..................19,259/68
Apr. 1, 1969 Switzerland ..........................4949/69

[52] U.S. Cl. .............................................204/164, 204/323
[51] Int. Cl. ...........................................B01k 1/00, C01g 23/04
[58] Field of Search.................................204/164; 23/80 T

[56] References Cited

UNITED STATES PATENTS

| | | | |
|---|---|---|---|
| 3,003,061 | 10/1961 | Berghaus et al. | 250/49.5 |
| 3,438,720 | 4/1969 | Cleaver | 204/164 |
| 3,494,762 | 2/1970 | Ishibashi | 204/164 |
| 3,516,921 | 6/1970 | Manion et al. | 204/311 |
| 3,532,462 | 10/1970 | Zirngibl et al. | 204/164 X |
| 2,854,392 | 10/1958 | Tokumoto et al. | 204/164 |

FOREIGN PATENTS OR APPLICATIONS

| | | | |
|---|---|---|---|
| 1,294,283 | 4/1962 | France | 204/164 |
| 1,065,385 | 9/1959 | Germany | 204/164 |

Primary Examiner—F. C. Edmundson
Attorney—Brady, O'Boyle & Gates

[57] ABSTRACT

Chemical reactions are carried out under the thermal action of the plasma of an arc discharge by causing a reactant containing a metal or metalloid to swirl and form a vortex in the liquid state so as to at least partially form and stabilize a plasma, and said reactant reacts in the plasma state to form a reaction product containing at least one metal or metalloid component. Chemical reactions which may be carried out are for example reduction, cracking reactions, decomposition and recombination reactions, oxidation, carbide formation and nitride formation.

5 Claims, 1 Drawing Figure

Patented April 25, 1972
3,658,673
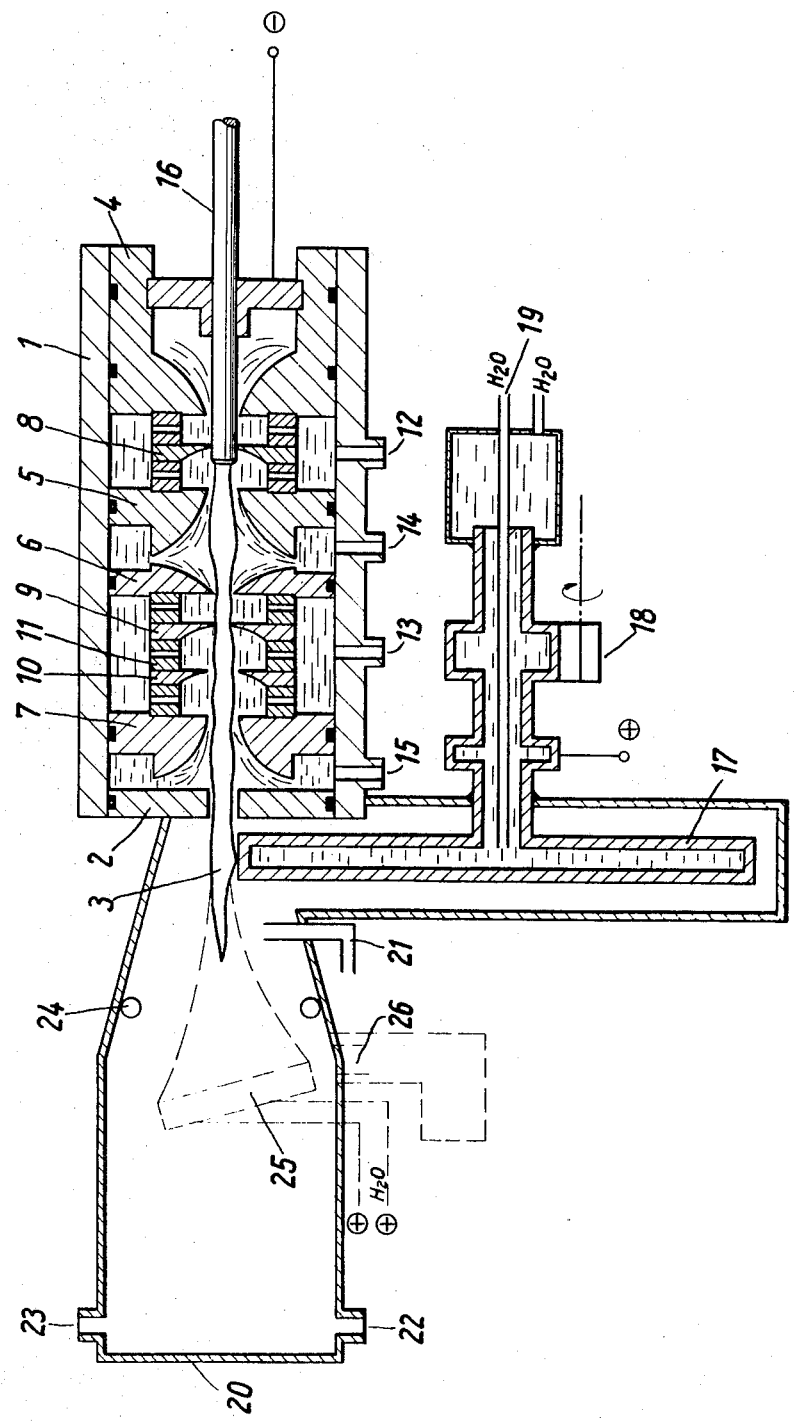
Inventors
TIBOR KUGLER
JAKOB SILBIGER
BY Brady, O'Boyle & Gates
ATTORNEYS

PROCESS FOR CARRYING OUT CHEMICAL REACTIONS

This invention relates to a process for carrying out chemical reactions in which the reactants are reacted under the thermal effect of the plasma of an arc discharge stabilized by means of a swirling liquid. It is known that one of the inert gases, or a diatomic gas, for example hydrogen, can be used as plasma gas and also that the arc discharge can be stabilized by a water vortex and the reactants can be exposed to the plasma jet serving as thermal conductor.

On account of heat losses only a part of the thermal energy of the plasma passes to the reaction space, and this part achieves only partial thermal equilibrium with the reactants.

The invention accordingly seeks to improve the energy yield.

This is achieved in accordance with the invention by causing at least one of the reactants in the liquid phase to form a vortex to stabilize the arc discharge.

A part of this reactant is thus vaporized and forms at least a part of the plasma, so that the plasma is not only a heat conductor as previously, but is also a reactant. The plasma can be formed either without the addition of gas and only by liquid vaporized from the vortex, or partly by added gas and partly by vaporized liquid, gas and vapor being intimately and completely uniformly mixed with one another in the latter case. In both cases one of the reactants is already at the temperature of the plasma when it comes into contact with the other reactant, with the result that the greatest possible proportion of the thermal energy of the plasma is immediately active in the reaction. The process in accordance with the invention also enables the reactants to be reacted in the discharge space between the electrodes.

The process in accordance with the invention is described in more detail in the following by examples of application to reduction, cracking reactions, decomposition and recombination, oxidation reactions, and carbide and nitride formation.

In these examples the process in accordance with the invention is carried out by means of a plasma reactor which is shown diagrammatically in longitudinal section in the sole FIGURE of the accompanying drawing.

The plasma reactor shown has a discharge chamber with a cylindrical sleeve 1, a front nozzle 2 through which flows a plasma jet 3, and a rear wall 4. Three diaphragms 5, 6 and 7 spaced apart from one another and from the nozzle 2 and the rear wall 4, are arranged in the discharge chamber. A diaphragm 8 is arranged between the rear wall 4 and the diaphragm 5, coaxially to the sleeve 1, and two diaphragms 9 and 10 are arranged between the diaphragms 6 and 7, coaxially to the sleeve 1. The external diameter of the diaphragms 8, 9 and 10 is smaller than the internal diameter of the sleeve 1. The aperture diameter of the diaphragm 10 is about the same as that of the diaphragms 5, 6 and 7, and the aperture diameter of the diaphragms 8 and 9 is somewhat smaller. The diaphragm 8 is separated from the rear wall 4 and the diaphragm 5, and the diaphragms 9 and 10 are separated from one another and from the diaphragms 6 and 7 by rings 11 whose external diameter corresponds to that of the diaphragms 8, 9 and 10. The internal diameter of the rings 11 is greater than the aperture diameter of the diaphragms 5 to 10, whereby a plurality of annular spaces bounded axially by every two adjacent diaphragms and radially by a ring are formed for the liquid vortex for stabilizing the arc discharge. The rings 11 have continuous bores which are tangential to their aperture circumference. Pipes 12 and 13 for the liquid used to produce the liquid vortex lead into the annular spaces between the diaphragms 8, 9 and 10, and between the rings 11 and the sleeve 1. Each of the diaphragms 5, 6 and 7 has an axially directed circular lip. Outlets 14 and 15 for the non-vaporized portion of the liquid, which is cooled and is led together with fresh liquid to the inlets 12 and 13, lead from the annular spaces between these circular lips and the sleeve 1. A rod cathode 16, e.g., of graphite, is inserted coaxially in the rear wall 4. A hollow, water cooled anode 17 in the form of a circular disc rotates in front of the nozzle 2 and is made of for example copper, carbon, titanium or aluminium, depending on the reaction to be carried out. The axis of the anode 17 is parallel to the axis of the discharge chamber and the end of the anode 17 is about the same distance from the axis of the discharge chamber as the circumference of the aperture of the nozzle 2. The drive means and cooling system for the anode 17 are numbered 18 and 19 respectively. The anode 17 is arranged at the mouth of a reaction chamber 20, which for certain reactions is made of for example ceramic, oxidic material, and is joined to the nozzle 2 and provided with a pipe 21 and two outlet connections 22 and 23. The reaction chamber 20 can be thermally insulated for certain reactions, and can be provided with heating or cooling means, a ring shower 24 for quenching the reaction products, a fixed, water cooled second copper anode 25, and an outlet 26.

REDUCTION

For the reduction of $TiCl_4$ to $TiCl_3$, the plasma reactor described with reference to the drawing is employed using a copper anode 17 but without the parts 24, 25 and 26.

One of the reactants, $TiCl_4$, is passed to the inlets 12 and 13, flows through the tangential bores in the rings 11 and forms a liquid vortex in the discharge space, being partially vaporized to form the plasma gas. Hydrogen as the second reactant is passed through the pipe 21 into the reaction chamber 20. The arc discharge is produced for example with a current of 500 amps. The plasma jet 3 has for example a diameter of 7 to 13 mm and is stabilized by the liquid vortex comprising $TiCl_4$.

Two successive step-wise reactions take place. In the first reaction titanium carbide and chlorine are formed from the carbon of the cathode and a part of the $TiCl_4$ in the space between the lips of the diaphragms 5 and 6. These reaction products are withdrawn from the outlet 14 together with $TiCl_4$, and are chilled. The amount of reaction products depends, among other things, on the size of the space between the lips of the diaphragms 5 and 6 and on the withdrawal rate. The second reaction takes place at the anode 17 according to the equation $TiCl_4 + \frac{1}{2}H_2 \rightarrow TiCl_3 + HCl$. The reaction products are withdrawn at 22 and 23.

For the reduction of $TiCl_4$ to Ti the plasma reactor is used with the aluminium cathode 17, but without the parts 21, 24, 25 and 26. Liquid Ti and aluminium chloride gas are thus formed, and the anode is gradually consumed.

CRACKING REACTION

For the cracking reaction of $SiCl_4$ the plasma reactor is used with the copper anode 17, the second copper anode 25 and the outlet 26, but without the shower 24. A voltage is applied to the second anode 25 which is more positive than the voltage at the anode 17, so that the discharge extends from the cathode 16 to the anode 17, and from this further to the second anode 25.

$SiCl_4$ is led through the inlets 12 and 13 for the formation and stabilization of the plasma, and the current (about 500 amps.) and the aperture diameters of the diaphragms 5 to 10 are chosen so that the plasma gas attains the required temperature for carrying out the reaction $SiCl_4 \rightarrow Si + 2Cl_2$. The cracking reaction takes place in the reaction chamber 20. The silicon metal condenses on the second anode 25, drains off from this, and is removed via the outlet 26. The remaining product, gaseous chlorine, is withdrawn through the outlets 22 and 23. A recombination in the reaction chamber 20 is prevented to a large extent by that part of the arc discharge which extends between the anode 17 and the second anode 25.

DECOMPOSITION AND RECOMBINATION

For the decomposition and recombination of $SiO_2$, the described plasma reactor is employed with the copper anode 17 and the shower 24, but without the parts 25 and 26.

Water for forming and stabilizing the plasma is passed to the inlets 12 and 13. Finely powdered quartz sand is blown, by means of air, through the pipe 21 into the plasma jet 3 issuing from the nozzle 2. An exchange reaction occurs between the vaporized quartz and the water plasma, in which at least a part of the oxygen of the $SiO_2$ is exchanged by oxygen from the water. The gaseous reaction products are chilled by water which is sprayed in through the ring shower 24, whereupon finely divided $SiO_2$ having a particle size of less than 0.001 mm diameter is obtained in the water.

OXIDATION REACTION

To produce titanium dioxide by the oxidation of $TiCl_4$, the described plasma reactor without the parts 24, 25 and 26 but with the titanium anode 17 is used, and also a reaction chamber 20 comprising ceramic, oxide material, an additional nozzle (not shown) which is directed opposite the anode 17 to the plasma jet 3, and an additional pipe (not shown), which leads into the discharge space between the cathode 16 and the nozzle 2.

Titanium tetrachloride is passed to the pipes 12 and 13 to form a part of the plasma and to stabilize the plasma. Pure oxygen is led into the plasma through the additional pipe, and further $TiCl_4$ is added to the plasma jet through the additional nozzle. Sixty kg of pigment titanium dioxide are for example obtained by this process, at an energy consumption of about 120 kWh.

CARBIDE FORMATION

To produce titanium carbide, the described plasma reactor is used with a carbon anode 17 and cooled reaction chamber 20, but without parts 21, 25 and 26, and with the shower 24 and an additional nozzle (not shown), which is directed opposite the anode 17 onto the plasma jet 3.

A liquid hydrocarbon, for example a hydrocarbon having an average carbon atom content of 10 to 15 C atoms per molecule, is added through the pipes 12 and 13 as stabilizing liquid and to form the plasma. Titanium tetrachloride is added to the plasma jet 3 through the additional nozzle, and the reaction $TiCl_4$ + hydrocarbon → TiC + hydrochloric acid takes place. The resulting reaction mixture is chilled with a mixture comprising equal parts of hydrogen and methane, by means of the ring shower 24. In this way 10 kg TiC having a particle size of less than 0.001 mm were obtained with a burner output of about 120 kW per hour.

Instead of adding titanium tetrachloride to the hydrocarbon plasma jet, titanium tetrachloride can also be used as stabilizing liquid and to form the plasma, and the hydrocarbon can be added to the plasma jet.

NITRIDE FORMATION

To prepare boron nitride, the described plasma reactor is used with a copper anode 17 but without the parts 21, 25 and 26, and with the shower 24 and an additional nozzle (not shown), which is directed opposite the anode 17 onto the plasma jet 3.

Vaporized $NH_3$ is added through the inlets 12 and 13 as stabilizing liquid and as a part of the reactants. Gaseous $NH_3$ as the remaining part of one of the reactants and boron oxide as the second reactant are added to the plasma jet 3 through the additional nozzle, and the reaction $B_2O_3 + 2NH_3 \rightarrow 2BN + 3H_2O$ takes place.

The reaction gases are chilled to 400° C by means of the shower 24, and are withdrawn separately through the outlets 22 and 23.

Tantalum nitride for example can be produced in a corresponding manner by adding tantalum chloride together with gaseous ammonia, instead of boron oxide, through the pipe 21 to the plasma jet, whereupon the reaction according to the equation $TaCl_5 + NH_3 \rightarrow TaN + 3HCl + 2Cl$ takes place.

The reactants may be interchanged, with the limitation that only one reactant which is liquid at a suitable temperature can be used as stabilizing liquid and simultaneously for the formation of the plasma.

We claim:

1. A process for reacting at least two reactants under the thermal action of the plasma of an arc discharge comprising:
   swirling at least one reactant in the liquid state and forming at least one vortex around the plasma arc discharge path,
   establishing an arc discharge and stabilizing it with said vortex,
   evaporating said one reactant at the inside of the vortex to form at least a part of the plasma of the arc discharge, and
   introducing at least another reactant into the plasma for reacting with said one reactant in the plasma state.

2. A process as set forth in claim 1, in which
   said another reactant is also caused in its liquid state to swirl and form a further vortex around the arc discharge path,
   stabilizing another section of the arc discharge with said further vortex, and
   evaporating the said another reactant at the inside of said further vortex and forming a further part of the plasma of the arc discharge therewith,
   whereby said one and said another reactants react with each other in the plasma state.

3. A process as set forth in claim 1, including forming the plasma of the arc discharge only by said at least one swirled and evaporated reactant without introduction of supplemental inert gas.

4. A process as set forth in claim 1,
   wherein said another reactant is mixed with said one reactant and swirled together to form said at least one vortex.

5. A process as set forth in claim 1, including establishing a plurality of vortices of different reactants in succession along and around the arc discharge path, and
   withdrawing different reaction products at points spaced along the arc discharge path.

* * * * *